(12) United States Patent
Takagi

(10) Patent No.: US 10,567,652 B2
(45) Date of Patent: Feb. 18, 2020

(54) COMMUNICATION APPARATUS WIRELESSLY COMMUNICABLE WITH EXTERNAL APPARATUS, CONTROL METHOD THEREOF, AND RECORDING MEDIUM

(71) Applicant: CANON KABUSHIKI KAISHA, Tokyo (JP)

(72) Inventor: Toshiyuki Takagi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 39 days.

(21) Appl. No.: 15/934,535

(22) Filed: Mar. 23, 2018

(65) Prior Publication Data

US 2018/0288327 A1 Oct. 4, 2018

(30) Foreign Application Priority Data

Mar. 30, 2017 (JP) ................... 2017-069216

(51) Int. Cl.
*H04N 5/232* (2006.01)
*H04W 52/02* (2009.01)
*H04W 4/80* (2018.01)

(52) U.S. Cl.
CPC ..... *H04N 5/23245* (2013.01); *H04N 5/23206* (2013.01); *H04N 5/23229* (2013.01); *H04N 5/23296* (2013.01); *H04N 5/232061* (2018.08); *H04W 52/0212* (2013.01); *H04W 4/80* (2018.02); *Y02D 70/00* (2018.01); *Y02D 70/10* (2018.01); *Y02D 70/14* (2018.01); *Y02D 70/142* (2018.01); *Y02D 70/144* (2018.01); *Y02D 70/166* (2018.01)

(58) Field of Classification Search
CPC ......... H04N 5/23245; H04N 5/232061; H04N 5/23229; H04N 5/23206; H04N 5/23296; H04W 52/0212; H04W 4/80; Y02D 70/14; Y02D 70/144; Y02D 70/10; Y02D 70/166; Y02D 70/00; Y02D 70/142
See application file for complete search history.

(56) References Cited

U.S. PATENT DOCUMENTS

2011/0058052 A1* 3/2011 Bolton ................ H04M 1/7253
348/211.99

FOREIGN PATENT DOCUMENTS

JP 2015-22259 A 2/2015

* cited by examiner

*Primary Examiner* — Padma Haliyur
(74) *Attorney, Agent, or Firm* — Canon U.S.A., Inc. IP Division

(57) ABSTRACT

An imaging apparatus includes an imaging unit, a communication unit that communicates with an external apparatus, and a control unit that controls the imaging apparatus with any one of a plurality of imaging modes using the imaging unit. The control unit controls the imaging unit based on content of a signal received from the external apparatus. The control unit enables transmission of information representing that communication via the communication unit is disconnectable to the external apparatus, based on the content of the received signal.

10 Claims, 8 Drawing Sheets

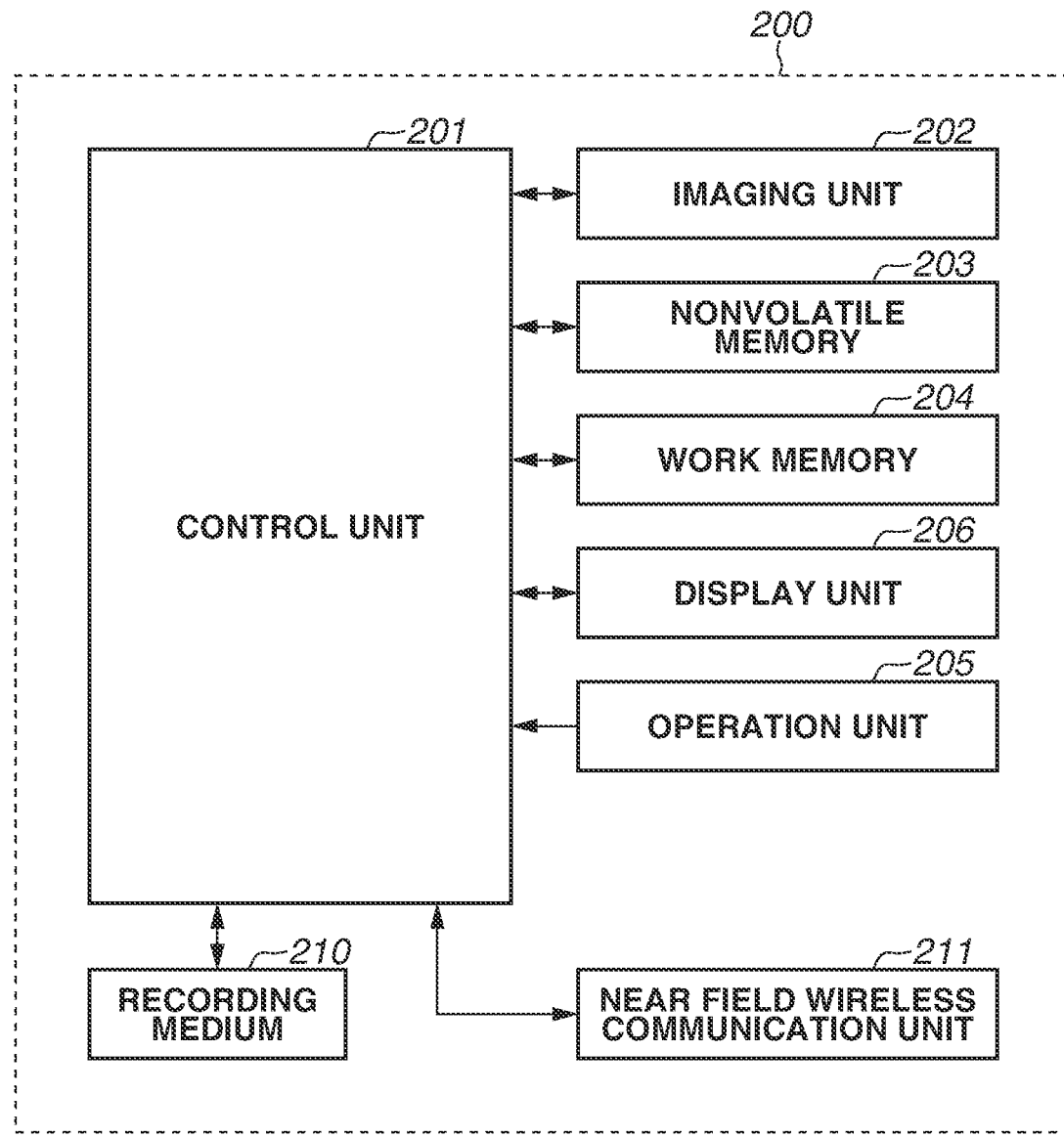

FIG.4A

AF BUTTON

| AF SETTING | IS DISCONNECTABLE STATE TO BE NOTIFIED? | PATTERN |
|---|---|---|
| ONE-SHOT AF | NOTIFY | PATTERN A |
| CONTINUOUS AF | NOT NOTIFY | PATTERN B |

FIG.4B

RELEASE BUTTON

| RELEASE OPERATION SELECTOR SWITCH | IMAGING MODE | DRIVE MODE | START AND END OF OPERATION | IS DISCONNECTABLE STATE TO BE NOTIFIED? | PATTERN |
|---|---|---|---|---|---|
| IMMEDIATELY | OTHER THAN BULB | SINGLE IMAGING | | NOTIFY | PATTERN C |
| | | CONTINUOUS IMAGING | | NOT NOTIFY | PATTERN D |
| | BULB | | START | NOTIFY | PATTERN E |
| | | | END | NOTIFY | PATTERN F |
| 2-SECOND DELAY | OTHER THAN BULB | SINGLE IMAGING | | NOTIFY | PATTERN G |
| | | CONTINUOUS IMAGING | | NOT NOTIFY | PATTERN H |
| | BULB | | START | NOTIFY | PATTERN I |
| | | | END | NOTIFY | PATTERN J |
| MOVING IMAGE | | | START | NOTIFY | PATTERN K |
| | | | END | NOTIFY | PATTERN L |

FIG.4C

Wide/Tele button

| DRIVING STATE OF LENS | IS DISCONNECTABLE STATE TO BE NOTIFIED? | PATTERN |
|---|---|---|
| ALREADY DRIVEN TO END | NOTIFY | PATTERN M |
| NOT DRIVEN TO END | NOT NOTIFY | PATTERN N |

COMMUNICATION APPARATUS WIRELESSLY COMMUNICABLE WITH EXTERNAL APPARATUS, CONTROL METHOD THEREOF, AND RECORDING MEDIUM

BACKGROUND

Field

The present disclosure relates to a communication apparatus wirelessly communicable with an external apparatus.

Description of the Related Art

Conventionally, remote control devices that remotely operate digital cameras are known. For example, Japanese Patent Application Laid-Open No. 2015-22259 discusses a system that remotely operates a digital camera using a remote controller.

In recent years, wireless local area network (LAN) communication, Bluetooth® communication, and the like are employed as wireless communication to be used for a remote operation. Among such wireless communication, Bluetooth® Low Energy communication is lower in directivity than infrared communication and is less in power consumption than wireless LAN communication.

A capacity of a battery installed on a remote controller is generally small. Therefore, to make power consumption as low as possible, even in low-power consumption communication, such as the Bluetooth® Low Energy communication, a connection and a disconnection are desired to be made as quickly as possible based on operations on a remote controller. In a case where communication, such as wireless LAN communication, that requires high power consumption is employed, the power consumption is desired to be further reduced.

In some occasions, such as continuous imaging and bulb imaging, a disconnection time is desired to be controlled via user operation.

SUMMARY

According to an aspect of the present disclosure, an imaging apparatus includes an imaging unit, a communication unit configured to communicate with an external apparatus, and a control unit configured to control the imaging apparatus with any one of a plurality of imaging modes using the imaging unit. The control unit controls the imaging unit based on content of a signal received from the external apparatus. The control unit enables transmission of information representing that communication via the communication unit is disconnectable to the external apparatus based on the content of the received signal.

Further features of the present disclosure will become apparent from the following description of exemplary embodiments with reference to the attached drawings.

BRIEF DESCRIPTION OF THE DRAWINGS

FIG. 2 is a block diagram illustrating a configuration of a digital camera according to the first exemplary embodiment.

FIGS. 4A, 4B, and 4C are tables illustrating whether Bluetooth® Low Energy communication is disconnectable based on a button operated through the remote control device and a setting status of the digital camera according to the first exemplary embodiment.

DESCRIPTION OF THE EMBODIMENTS

Exemplary embodiments for carrying out the present disclosure will be described in detail below with reference to the accompanying drawings.

The exemplary embodiments described below are examples that realize the present disclosure, and can be appropriately amended or modified based on configurations and various conditions of apparatuses to which the present disclosure is applied. The respective exemplary embodiments can be appropriately combined.

<Configuration of Remote Controller 100>

Figure 1A:
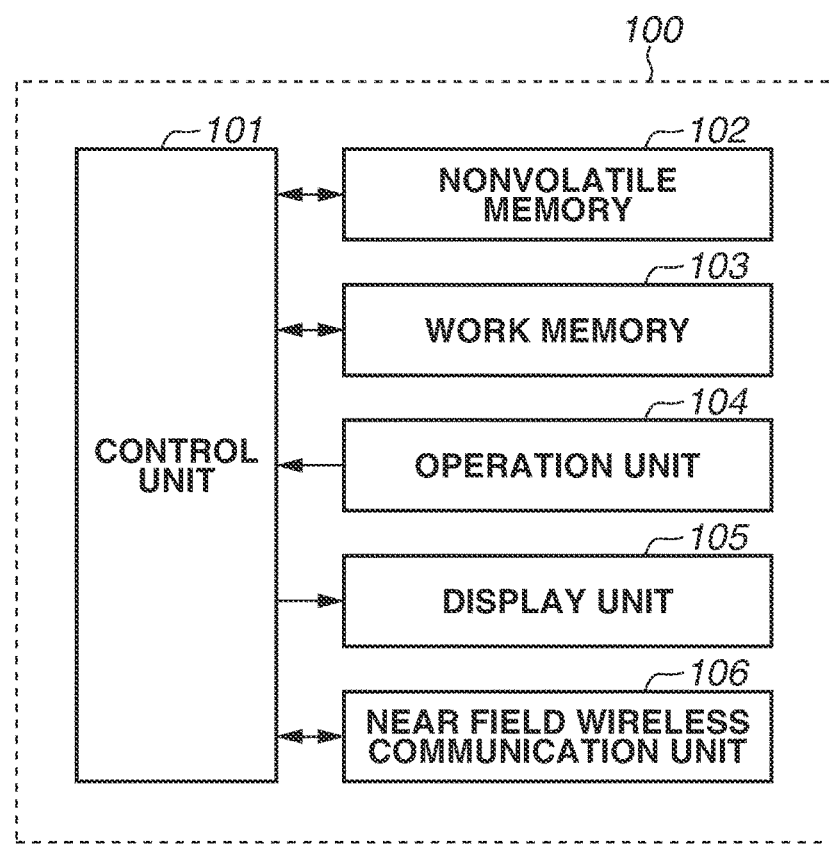
FIGS. 1A and 1B are block diagrams illustrating a configuration of a remote control device according to a first exemplary embodiment.

A first exemplary embodiment will be described below. FIG. 1A is a block diagram illustrating a configuration example of a remote controller 100 which is one example of a remote control device according to the present exemplary embodiment.

A control unit 101 controls each unit of the remote controller 100 in accordance with an input signal. A control operation on an entire apparatus may be shared by a plurality of pieces of hardware instead of being controlled by the control unit 101.

A nonvolatile memory 102 is a nonvolatile memory in which electric erasing and recording are enabled, and programs to be executed by the control unit 101 are stored.

A work memory 103 is used as a work area of the control unit 101.

An operation unit 104 is used to accept an instruction for the remote controller 100 from a user. The operation unit 104 includes operation members such as a release button with which the user causes a digital camera 200 to capture an image, an autofocus (AF) button for performing an AF operation, and a wide-angle (Wide) button and a telephoto (Tele) button for driving a zoom lens.

A display unit 105 is, for example, a light emitting diode (LED) display device. The display unit 105 displays a status that an operation through the operation unit 104 is accepted from the user, an operation request is transmitted to the digital camera 200, its response is received, and the digital camera 200 operates. For example, in a case where the user presses down the AF button, an AF request is transmitted to the digital camera 200, and the digital camera 200 performs the AF operation. Upon reception of an in-focus point signal as a response from the digital camera 200, the display unit 105 blinks.

A near field wireless communication unit 106 includes, for example, an antenna for wireless communication, a modulation/demodulation circuit for processing a radio signal, and a communication controller. The near field wireless communication unit 106 is an interface for connection with an external apparatus. The remote controller 100 according to the present exemplary embodiment can exchange data and commands with the external apparatus via the near field wireless communication unit 106.

In the present exemplary embodiment, the near field wireless communication unit 106 outputs a modulated radio signal from the antenna, and demodulates the radio signal received through the antenna to realize near field wireless communication according to a standard of IEEE 802.15 (Bluetooth®). In the present exemplary embodiment, the Bluetooth® communication employs Bluetooth® Low Energy version 4.0 in which the power consumption is low. In the Bluetooth® Low Energy communication, a communicable range is narrower (i.e., a communicable distance is shorter) than in wireless LAN communication. In the Bluetooth® Low Energy communication, a communication speed is slower than in wireless LAN communication. In the Bluetooth® Low Energy communication, power consumption is lower than in wireless LAN communication. The remote controller 100 makes the Bluetooth® Low Energy communication with the digital camera 200 via the near field wireless communication unit 106.

The above-described communication method is not limited to the Bluetooth® Low Energy communication method, and also includes, for example, a Bluetooth® method before version 3.0, a wireless LAN method, and an infrared communication method.

Figure 1B:
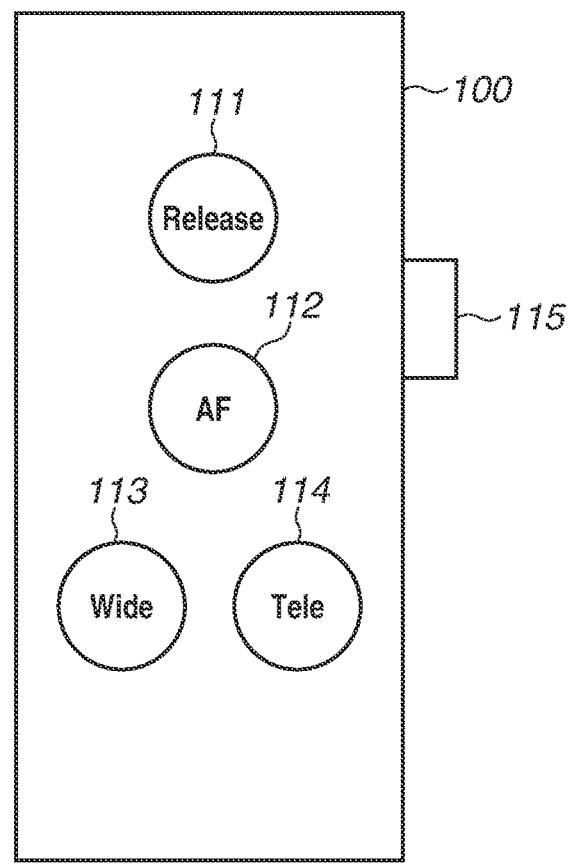

FIG. 1B is a diagram illustrating one example of an appearance of the remote controller 100. The operation unit 104 includes a release button 111, an AF button 112, a Wide button 113, a Tele button 114, and a release operation selector switch 115.

An imaging request is transmitted to the digital camera 200 by the user pressing the release button 111, and an AF request is transmitted to the digital camera 200 by the user pressing the AF button 112.

A Wide request for driving a zoom lens to a Wide side is transmitted to the digital camera 200 by the user pressing the Wide button 113, and a Tele request for driving the zoom lens to a Tele side is transmitted to the digital camera 200 by the user pressing the Tele button 114.

The release operation selector switch 115 is for performing three settings including immediate release, two-second delay release, and moving image. Depending on the state of this switch, the operation performed when the release button 111 is pressed and an imaging request is transmitted to the digital camera 200 varies.

In a case where the digital camera 200 receives an imaging request for which the release operation selector switch 115 is set to the immediate release, the digital camera 200 immediately performs the imaging operation.

Upon reception of an imaging request for which the release operation selector switch 115 is set to the two-second delay release, the digital camera 200 performs the imaging operation when 2 seconds elapse after the reception.

Upon reception of an imaging request of set by the release operation selector switch 115 is set to the moving image, the digital camera 200 starts capturing a moving image.

Further, the digital camera 200 has a bulb imaging (imaging such that a shutter is kept opened for a time period according to a user's operation) mode. In the present exemplary embodiment, in a case where the digital camera 200 is in the bulb imaging mode, the digital camera 200 starts the bulb image imaging through pressing-down of the release button 111 of the remote controller 100 and ends the bulb imaging through pressing-down of the release button 111 of the remote controller 100 again.

<Configuration of Digital Camera 200>

FIG. 2 is a block diagram illustrating a configuration example of the digital camera 200 as one example of an imaging apparatus according to the present exemplary embodiment. Herein, the digital camera 200 will be described as one example of the imaging apparatus, but the imaging apparatus is not limited to this. The imaging apparatus may be a portable media player, and an information processing apparatus such as a tablet device and a personal computer.

A control unit 201 controls each unit of the digital camera 200 in accordance with an input signal and a program described below. The entire apparatus may be controlled in such a manner that the process in the entire apparatus is shared by a plurality of pieces of hardware instead of being controlled by the control unit 201.

An imaging unit 202 includes an optical system that controls an optical lens portion, an aperture, zoom, focus, etc., and an image sensor that converts light (video) introduced through the optical lens portion into an electric video signal. As the image sensor, generally a complementary metal-oxide semiconductor (CMOS) sensor, or a charge coupled device (CCD) sensor is used. The imaging unit 202 is controlled by the control unit 201 to convert subject light focused by a lens included in the imaging unit 202 into an electric signal through the image pickup device and execute a noise reduction process. The imaging unit 202 then outputs digital data as image data. In the digital camera 200 according to the present exemplary embodiment, image data is recorded in a recording medium 210 in accordance with a standard of Design Rule for Camera File System (DCF). The lens portion and the optical system may be partially contained in the digital camera 200 or may be configured detachably.

A nonvolatile memory 203 is a nonvolatile memory in which electric erasing and recording are enabled, and programs to be executed by the control unit 201 are stored.

A work memory 204 is used as a buffer memory that temporarily holds image data obtained by the imaging unit 202, an image display memory of a display unit 206, and a work area of the control unit 201.

A operation unit 205 is used for accepting an instruction for the digital camera 200 from a user. The operation unit 205 includes, for example, a power button for the user to give an instruction to power the digital camera 200 ON/OFF, a release switch for the user to give an instruction to capture an image, a moving image capture switch for the user to give an instruction to capture a moving image, and a play button for the user to give an instruction to play image data. Further, the operation unit 205 further includes a touch panel formed in the display unit 206 (described below). The release switch includes switches SW1 and SW2. The switch SW1 is turned ON by pressing the release switch halfway down. As a result, the digital camera 200 accepts instructions to prepare for an autofocus (AF) process, an auto exposure (AE) process, an auto white balance (AWB) process, and a pre-flash (EF) process. Further, the switch SW2 is turned ON by pressing the release switch all the way down. As a result, the digital camera 200 accepts the instruction to capture an image.

The display unit 206 displays a viewfinder image during imaging, captured image data, and characters for dialogue operation. The display unit 206 is not necessarily contained in the digital camera 200. The digital camera 200 can be connected to the display unit 206 inside or outside the digital camera 200, and may include at least a display control function for controlling display of the display unit 206.

The recording medium 210 can record image data output from the imaging unit 202. The recording medium 210 may be configured detachably from the digital camera 200 or may be contained in the digital camera 200. That is, the digital camera 200 may include at least means that accesses to the recording medium 210.

A near field wireless communication unit 211 includes, for example, an antenna for wireless communication, a modulation/demodulation circuit for processing a radio signal, and a communication controller. The near field wireless communication unit 211 outputs a modulated radio signal from the antenna and demodulates a radio signal received by the antenna to realize near field wireless communication according to the standard of IEEE 802.15 (Bluetooth®). In the present exemplary embodiment, the Bluetooth® communication employs Bluetooth® Low Energy version 4.0 in which the power consumption is low. In the Bluetooth® Low Energy communication, a communicable range is narrower (i.e., a communicable distance is shorter) than in wireless LAN communication. In the Bluetooth® Low Energy communication, a communication speed is slower than in wireless LAN communication. In the Bluetooth® Low Energy communication, the power consumption is lower than in wireless LAN communication. The digital camera 200 makes the Bluetooth® Low Energy communication with the remote controller 100 via the near field wireless communication unit 211.

<Configuration of Network System>

Figure 3:
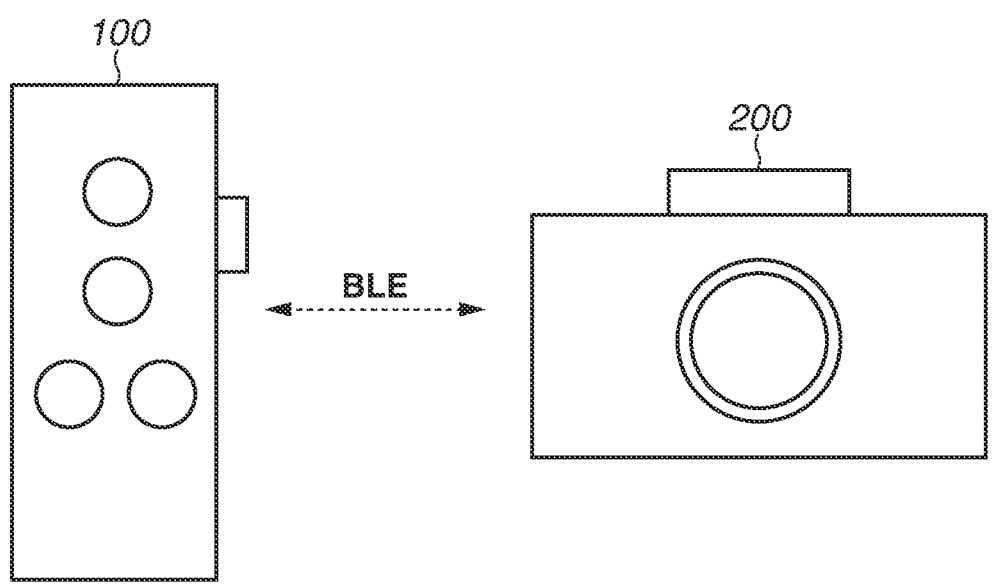
FIG. 3 is a diagram illustrating one example of a network configuration of the remote control device and the digital camera according to the first exemplary embodiment.

FIG. 3 is a diagram schematically illustrating one example of a network system according to the present exemplary embodiment. In the present exemplary embodiment, a system in which the remote controller 100 and the digital camera 200 make the Bluetooth® Low Energy communication will be described as an example. As illustrated in FIG. 3, the network system includes the remote controller 100 and the digital camera 200 which can make near field wireless communication via the Bluetooth® Low Energy communication.

The digital camera 200 according to the present exemplary embodiment accepts a remote instruction according to an operation of the remote controller 100 via the Bluetooth® Low Energy communication with the remote controller 100 to execute a process according to the instruction.

The digital camera 200 performs, for example, the AF operation and the imaging operation. These operations are performed only once or are repeatedly performed in a case where the user continues to operate the remote controller 100 (for example, a button remains pressed).

In the present exemplary embodiment, in a case where the operation is performed only once in response to one operation, even if the user continues to operate the remote controller, the Bluetooth® Low Energy communication ends.

In a case where the operation is performed repeatedly during the operation in response to one operation, while the user continues to operate the remote controller 100, the Bluetooth® Low Energy communication is maintained.

Examples of the operation to be executed only once in response to one operation are a one-shot AF operation, a single imaging operation, and a moving image capturing operation. Further, in the present exemplary embodiment, the bulb imaging operation is also performed only once in response to one operation. In general, in an operation on a digital camera body, the bulb imaging is started by pressing down the release switch and is ended by releasing the release switch. In the case of the remote controller 100, the bulb imaging is started by pressing down the release button 111 and is ended by pressing down the release button 111 again. To suppress power consumption of the remote controller 100, the communication is not maintained during the bulb imaging by disconnecting the Bluetooth® Low Energy communication per operation.

Examples of the operation to be repeatedly executed during the operation performed in response to one operation are a continuous imaging operation and a zoom operation. However, in the zoom operation, in a case where the operation is performed up to the ends of the Wide side and the Tele side, further operation cannot be performed. For this reason, even if the remote controller 100 continues to be operated, the communication ends.

<Sequence for Notifying Disconnectable State by Digital Camera 200>

FIGS. 4A to 4C are tables illustrating whether the digital camera 200 is to notify the remote controller 100 of a disconnectable state of the Bluetooth® Low Energy communication based on a button operated by the remote controller 100 or a setting status of the digital camera 200.

Figure 5:
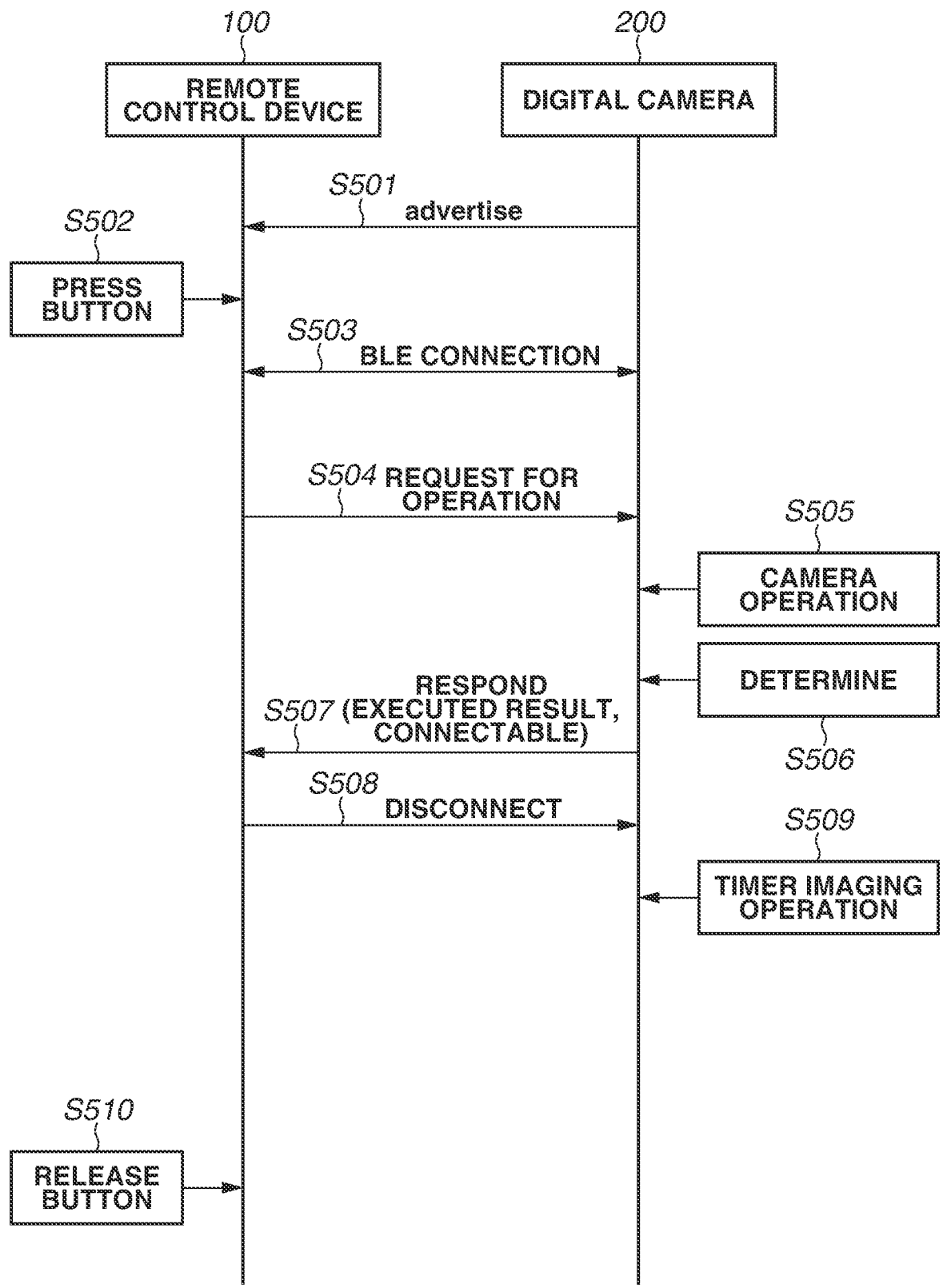
FIG. 5 is a diagram illustrating a sequence in which the Bluetooth® Low Energy communication is disconnectable according to the first exemplary embodiment.

FIG. 5 is a diagram illustrating a sequence in which the Bluetooth® Low Energy communication according to the first exemplary embodiment is disconnectable. Patterns A, C, E, F, G, I, J, K, L, and M in FIGS. 4A to 4C form this sequence. This sequence applies in a case that even if the operation unit 104 of the remote controller 100 is operated and a button continues to be pressed, the digital camera 200 operates only once and the operation does not continue.

The description herein is described based on the assumption that the remote controller 100 and the digital camera 200 have been Bluetooth® Low Energy-paired.

In step S501, the digital camera 200 transmits an advertisement packet if it is paired with the remote controller 100. The transmission of the advertisement packet is repeated until Bluetooth® Low Energy connection is established. The advertisement packet is transmitted to an unspecified transmission destination through broadcast.

The remote controller 100 executes a scanning process for Bluetooth® Low Energy advertisement through pressing of a button of the operation unit 104 in step S502. In the scanning process, the advertisement packet of the digital camera 200 is received, a packet content is verified, and a determination is made whether the pairing has been finished. If the pairing has been finished, Bluetooth® Low Energy connection with the digital camera 200 is established in step S503.

After the establishment of the Bluetooth® Low Energy connection, the remote controller 100 transmits an operation request to the digital camera 200 in step S504 through the button pressed in step S502. At this time, the remote controller 100 transmits a type of the pressed button and a value of the release operation selector switch 115 to the digital camera 200.

In step S505, the digital camera 200 operates based on the received operation request, and determines that the Bluetooth® Low Energy communication is disconnectable (step S506) because this operation operates only once and does not continue.

In step S507, the digital camera 200 notifies the remote controller 100 of a result of the operation and the disconnectable state as a response to the operation request. The determination in step S506 and the notification in step S507 are performed in parallel with the operation in step S505 without waiting for completion of the operation in step S505.

If the remote controller 100 receives the response, the Bluetooth® Low Energy communication is disconnectable. The Bluetooth® Low Energy communication is thus disconnected in step S508. If the button is released in step S510, the remote controller 100 performs no operation.

In this sequence, even if a button of the remote controller 100 is pressed, the digital camera 200 performs an operation only once and returns a response. Therefore, the user recognizes unnecessity of the continuation of the Bluetooth® Low Energy communication through the remote controller 100. For this reason, the remote controller 100 can disconnect the Bluetooth® Low Energy communication, and thus the power consumption of the remote controller 100 can be reduced.

As to the operation in step S505, the determination in step S506, and the response in step S507 in the digital camera 200 at this time, a plurality of patterns illustrated in FIGS. 4A to 4C will be described below.

Pattern A: AF Button

If the AF setting is one-shot AF, the digital camera 200 performs the AF operation in step S505. This operation is the one-shot AF operation which is performed only once and thus does not continue. Therefore, the digital camera 200 determines that the Bluetooth® Low Energy communication is disconnectable in step S506.

The digital camera 200 notifies the remote controller 100 of a result of the AF operation and the disconnectable state as the response to the operation request in step S507.

Pattern C: Release Button, "Immediate Release", other Than Bulb Imaging, and Single Imaging If not in the bulb imaging mode, the digital camera 200 performs the AF operation, and if in-focus succeeds, performs the single imaging in step S505. If the in-focus fails, the digital camera 200 does perform the single imaging. Since the operation is the single-imaging operation and is performed only once and thus does not continue, the digital camera 200 determines that the Bluetooth® Low Energy communication is disconnectable in step S506.

The digital camera 200 notifies the remote controller 100 of a result of the AF operation and the disconnectable state as a response to the operation request in step S507.

Pattern E: Release Button, "Immediate Release", and Start Bulb Imaging

If the digital camera 200 is not performing the bulb imaging in the bulb imaging mode, the digital camera 200 performs the AF operation, and when in-focus succeeds, starts the bulb imaging in step S505. If the in-focus fails at this time, the digital camera 200 does not start the bulb imaging. Since this operation is for starting the bulb imaging and is performed only once and thus does not continue, the digital camera 200 determines that the Bluetooth® Low Energy communication is disconnectable in step S506.

Thereafter, the digital camera 200 notifies the remote controller 100 of a result of the AF operation and the disconnectable state as a response to the operation request in step S507.

Pattern F: Release Button, "Immediate Release", end Bulb Imaging

If the digital camera 200 is performing the bulb imaging in the bulb imaging mode, the digital camera 200 ends the bulb imaging in step S505. Since this operation is for ending the bulb imaging and is performed only once and thus does not continue, the digital camera 200 determines that the Bluetooth® Low Energy communication is disconnectable in step S506.

The digital camera 200 notifies the remote controller 100 of the successful end of the bulb imaging and the disconnectable state as a response to the operation request in step S507.

Pattern J: Release Button, "2-second Delay Release", End Bulb Imaging

The pattern J is similar to the pattern F.

Pattern G: Release Button, "2-second Delay Release", other than Bulb Imaging, Single Imaging If not being in the bulb imaging mode, the digital camera 200 performs the AF operation in step S505. Since this operation is the single-imaging operation and is performed only once and thus does not continue, the digital camera 200 determines that the Bluetooth® Low Energy communication is disconnectable in step S506.

The digital camera 200 notifies the remote controller 100 of a result of the AF operation and the disconnectable state as a response to the operation request in step S507.

If the in-focus succeeds in step S505, the digital camera 200 starts the single imaging as a timer imaging operation after a lapse of 2 seconds in step S509. If the in-focus fails in step S505, the digital camera 200 does not perform the single imaging.

Pattern I: Release Button, "2-second Delay Release", Start Bulb Imaging

If not performing the bulb imaging in the bulb imaging mode, the digital camera 200 performs the AF operation in step S505. Since this operation is for starting the bulb imaging and is performed only once and thus does not continue, the digital camera 200 determines that the Bluetooth® Low Energy communication is disconnectable in step S506.

The digital camera 200 notifies the remote controller 100 of a result of the AF operation and the disconnectable state as a response to the operation request in step S507.

If in-focus succeeds in step S505, the digital camera 200 starts the bulb imaging as the timer imaging operation after a lapse of 2 seconds in step S509. If the in-focus fails in step S505, the digital camera 200 does not start the bulb imaging.

Pattern K: Release Button, "Moving Image", Start Moving Image

If not capturing a moving image in a moving image capturing mode, the digital camera 200 starts capturing a moving image in step S505. Since this operation is for starting the moving image capturing operation which is performed only once and does not continue, the digital camera 200 determines that the Bluetooth® Low Energy communication is disconnectable in step S506.

The digital camera 200 notifies the remote controller 100 of the successful start of the moving image capturing and the disconnectable state as a response to the operation request in step S507.

Pattern L: Release Button, "Moving Image", End Moving Image

If the digital camera 200 is capturing a moving image in the moving image capturing mode, the digital camera 200 ends the moving image capturing in step S505. Since this operation is for ending the moving image capturing which is performed only once and thus does not continue, the digital camera 200 determines that the Bluetooth® Low Energy communication is disconnectable in step S506.

The digital camera 200 notifies the remote controller 100 of the successful end of the moving image capturing and the disconnectable state as a response to the operation request in step S507.

Pattern M: Wide Button, Tele Button: Driven to the End

If the lens is driven to the end of the Wide side, the digital camera 200 does not drive the lens to the Wide side in step S505. Since the lens is driven to the end, even if the button continues to be pressed, the digital camera 200 does not continue the operation. Therefore, the digital camera 200 determines that the Bluetooth® Low Energy communication is disconnectable in step S506.

The digital camera 200 notifies the remote controller 100 of fail in driving to the Wide side and the disconnectable state as a response to the operation request in step S507.

Much the same is true on a case where the Tele button is pressed.

<Sequence in which the Digital Camera 200 does not Notify the Disconnectable State>

Figure 6:
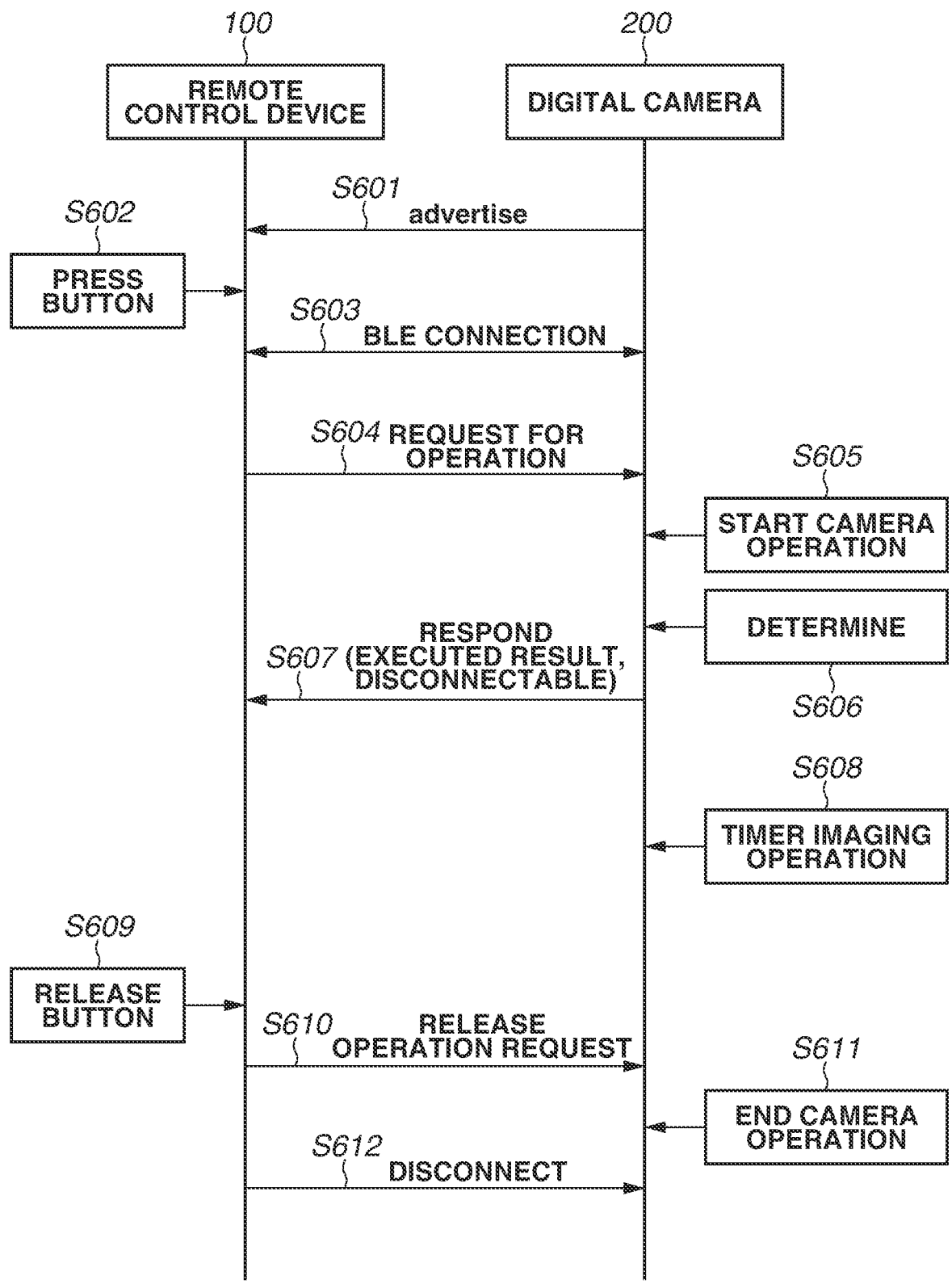
FIG. 6 is a diagram illustrating a sequence in which the Bluetooth® Low Energy communication is not the disconnectable according to the first exemplary embodiment.

FIG. 6 is a diagram illustrating a sequence in which the Bluetooth® Low Energy communication is not disconnectable according to the first exemplary embodiment. Patterns B, D, H, and N in FIGS. 4A to 4C are this sequence.

In this sequence, while the operation unit 104 of the remote controller 100 is operated and a button continues to be pressed, the digital camera 200 continues the operation.

The description herein is described on the assumption that the remote controller 100 and the digital camera 200 have been paired.

If the digital camera 200 has been paired with the remote controller 100, the digital camera 200 transmits an advertisement packet in step S601. If the operation unit 104 is operated and a button is pressed in step S602, the remote controller 100 verifies content of the advertisement packet of the digital camera 200. If they are already paired, the remote controller 100 establishes the Bluetooth® Low Energy connection with the digital camera 200 in step S603.

After the Bluetooth® Low Energy connection is established, the remote controller 100 transmits an operation request to the digital camera 200 through the pressed button in step S604. At this time, the remote controller 100 transmits a type of the pressed button and a value of the release operation selector switch 115 to the digital camera 200.

Since the digital camera 200 performs the operation in response to the received operation request in step S605 and this operation continues while the button is continuously pressed, the digital camera 200 determines that the Bluetooth® Low Energy communication is not disconnectable in step S606.

The digital camera 200 notifies the remote controller 100 about a result of the operation and a non-disconnectable state as a response to the operation request in step S607.

If the remote controller 100 receives the response, it is not disconnectable from the digital camera 200, and thus the Bluetooth® Low Energy communication is maintained. If the button is released in step S609, the remote controller 100 notifies about release of the operation request in step S610.

In step S611, the digital camera 200 ends the operation because the button of the remote controller 100 is released.

In step S612, the remote controller 100 disconnects the Bluetooth® Low Energy communication because the button is released.

In this sequence, while the button of the remote controller 100 is continuously pressed, the digital camera 200 continues the operation. Therefore, the user recognizes that the Bluetooth® Low Energy communication needs to be maintained through the remote controller 100. For this reason, the remote controller 100 can maintain the Bluetooth® Low Energy communication without disconnecting it, and thus while the button of the remote controller 100 is continuously pressed, the digital camera 200 can continue the operation.

The operation in step S605, the determination in step S606, and the response in step S607 of the digital camera 200 at this time will be described below in a plurality of patterns illustrated in FIGS. 4A to 4C.

Pattern B: AF Button

If the AF setting is continuous AF in which while the release switch is being pressed halfway down, focusing is continuously performed without fixing an in-focus position, the digital camera 200 performs the AF operation in step S605. Since this operation continues while the button is being pressed, the digital camera 200 determines that the Bluetooth® Low Energy communication is not disconnectable in step S606.

The digital camera 200 notifies the remote controller 100 about a result of the AF operation and a non-disconnectable state as a response to the operation request in step S607.

At this time, the AF operation continues from steps S605 through S611.

Pattern D: Release Button, "Immediate Release", other Than Bulb Imaging, and Continuous Imaging If not being in the bulb imaging mode, the digital camera 200 performs the AF operation. If the in-focus succeeds, the digital camera 200 starts the continuous imaging in step S605. Since this operation continues while the button is being pressed, the digital camera 200 determines that the Bluetooth® Low Energy communication is not disconnectable in step S606.

In step S607, the digital camera 200 notifies the remote controller 100 about a result of the AF operation and a non-disconnectable state as a response to the operation request.

At this time, the digital camera 200 continues the continuous imaging in step S605 through step S611.

If the digital camera 200 performs the AF operation in step S605 and the in-focus fails, the digital camera 200 repeats the AF operation in step S605 through step S611, and can start the continuous imaging just after the in-focus.

Pattern H: Release Button, "2 Second", other Than Bulb Imaging, Continuous Imaging If not being in the bulb imaging mode, the digital camera 200 performs the AF operation in step S605. Since this operation continues while the button is being pressed, the digital camera 200 determines that the Bluetooth® Low Energy communication is not disconnectable in step S606.

The digital camera 200 notifies the remote controller 100 about a result of the AF operation and a non-disconnectable state as a response to the operation request in step S607.

The digital camera 200 performs the AF operation in step S605. If in-focus succeeds, the digital camera 200 starts the continuous imaging after a lapse of 2 seconds in step S608.

At this time, the digital camera 200 continues to perform the continuous imaging in step S608 through step S611.

The digital camera 200 performs the AF operation in step S605. If the in-focus fails, in step S605, the digital camera 200 repeats the AF operation in step S605 through step S611, and can start the continuous imaging when 2 seconds elapse after the in-focus.

Pattern N: Wide button, Tele button: not driven to the end

If the lens is not driven to the end of the Wide side, the digital camera 200 drives the lens to the Wide side in step S605. Since this operation continues while the button continues to be pressed, the digital camera 200 determines that the Bluetooth® Low Energy communication is not disconnectable in step S606.

The digital camera 200 notifies the remote controller 100 of succeeding in the driving to the Wide side and a non-disconnectable state as a response to the operation request in step S607.

At this time, the lens driving to the Wide side continues in step S605 through step S611.

If the lens is driven to the end of the Wide side while the Wide button 113 is being pressed, at the time the digital camera 200 may notify the remote controller 100 of the disconnectable state. Upon reception of the response, the remote controller 100 may disconnect the Bluetooth® Low Energy communication because of the disconnectable state.

Much the same is true on a case where the Tele button 114 is pressed.

<Flow after Button of Remote Controller 100 is Pressed Down and the Bluetooth® Low Energy Communication is Established>

Figure 7:
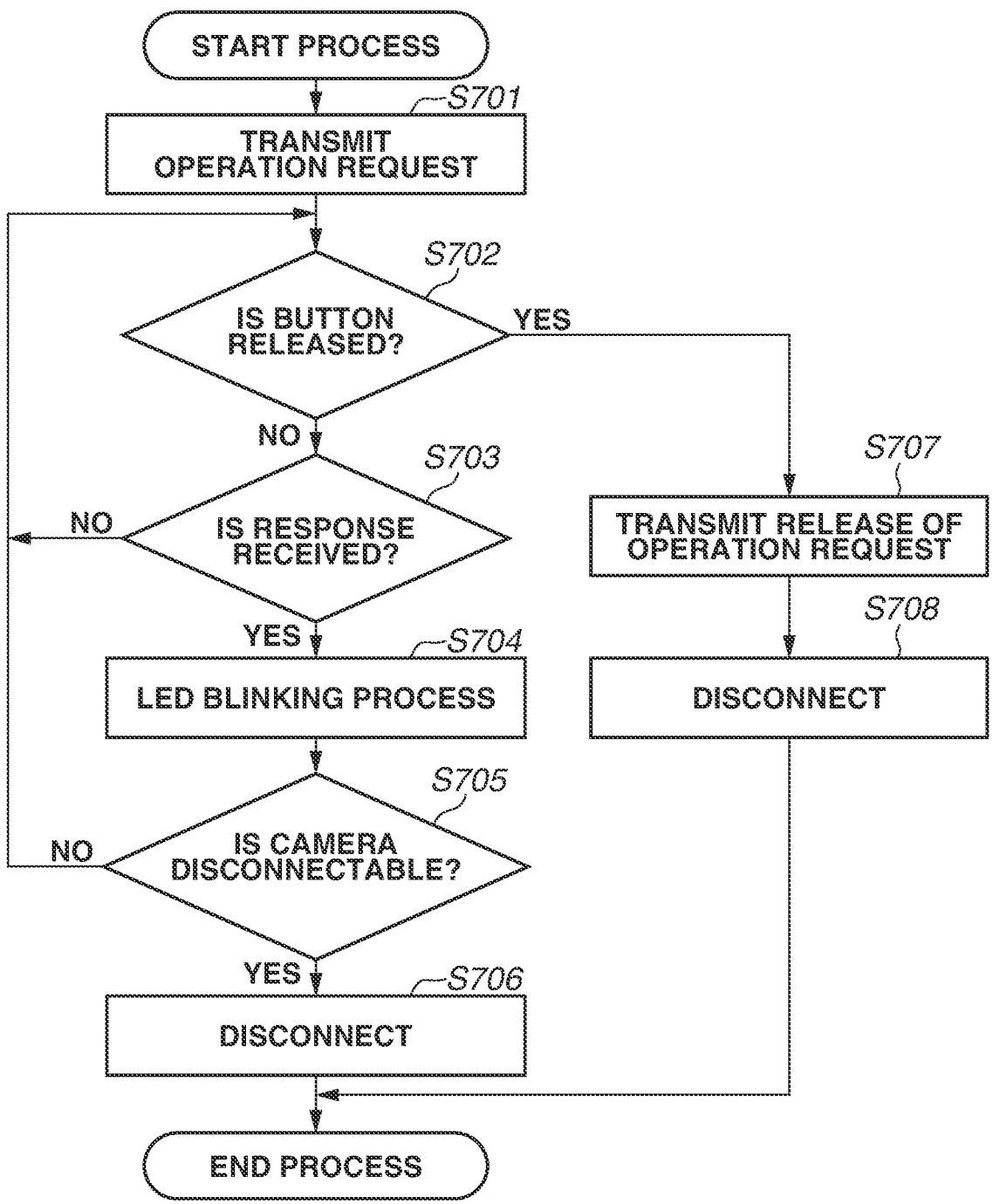
FIG. 7 is a diagram illustrating a flow after the Bluetooth® Low Energy communication between the remote control device and the digital camera is established according to the first exemplary embodiment.

FIG. 7 is a flowchart illustrating the operation of the remote controller 100. The operation in this flowchart starts when a pressing operation is performed on the operation unit 104 of the remote controller 100 and thus the Bluetooth® Low Energy communication with the digital camera 200 is established.

In step S701, the control unit 101 transmits an operation request to the digital camera 200. At this time, the control unit 101 transmits a type of operation button pressed on the operation unit 104 and a value of the release operation selector switch 115 to the remote controller 100.

In step S702, the control unit 101 determines whether the button is released on the operation unit 104.

Description will be given as to a case where the determination is made that the release operation is not performed on the operation unit 104 (NO in step S702) as a result of the determination in step S702. In this case, in step S703 the control unit 101 determines whether a response is received from the digital camera 200.

If the response is determined to be received from the digital camera 200 (YES in step S703) as a result of the determination in step S703, in step S704 the control unit 101 causes the display unit 105 to blink in accordance with content of the received response.

Further, in step S705 the control unit 101 determines, based on the response received from the digital camera 200, whether the disconnectable state of the Bluetooth® Low Energy communication is notified. Step S705 may be executed in parallel with step S703.

If the disconnectable state of the Bluetooth® Low Energy communication is determined to be notified (YES in step S705) as a result of the determination in step S705, in step S706 the control unit 101 disconnects the Bluetooth® Low Energy communication.

The above description refers to the case where the determination is made in step S702 that the button is not released on the operation unit 104.

The following will describe a case where the determination is made in step S702 that the button is released on the operation unit 104 (YES in step S702). In this case, even if the response is received from the digital camera 200 and the Bluetooth® Low Energy communication is not disconnectable, in step S707 the control unit 101 transmits cancellation of the operation request to the digital camera 200.

In step S708 the control unit 101 disconnects the Bluetooth® Low Energy communication.

If not receiving the response from the digital camera 200 as a result of the determination in step S703, the control unit 101 again determines in step S702 whether the button has been released on the operation unit 104.

If the Bluetooth® Low Energy communication is not disconnectable (NO in step S705) as a result of the determination in step S705, the control unit 101 again determines in step S702 whether the button is released on the operation unit 104.

The above description refers to the operation of the remote controller 100.

<Flow after Bluetooth® Low Energy Communication of Digital Camera 200 is Established and Operation Request is Received>

Figure 8:
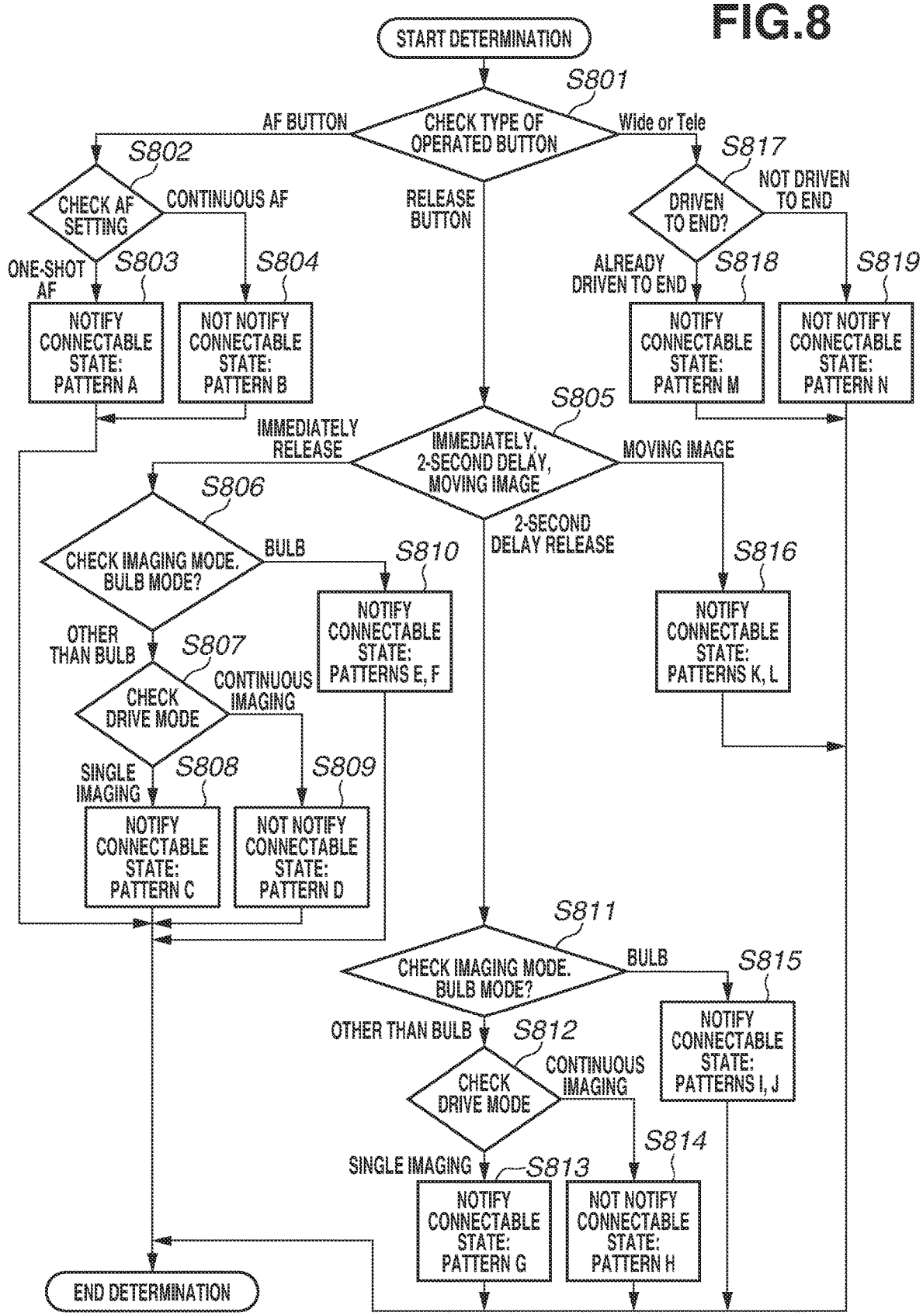
FIG. 8 is a diagram illustrating a flow after the Bluetooth® Low Energy communication between the remote control device and the digital camera is established and an operation request is received according to the first exemplary embodiment.

FIG. 8 is a flowchart illustrating the operation of the digital camera 200. The operation in this flowchart starts when the Bluetooth® Low Energy communication with the remote controller 100 is established and an operation request is received.

In step S801, if the control unit 201 establishes the Bluetooth® Low Energy communication with the remote controller 100 and receives an operation request therefrom, the control unit 201 determines a type of operated button.

A case where the determination is made in step S801 that the operated button is the AF button 112 (AF BUTTON in step S801) will be described. In this case, in step S802 the control unit 201 verifies AF setting.

If the AF setting is determined to be one-shot AF (ONE-SHOT AF in step S802) as a result of the determination in step S802, in step S803 the control unit 201 notifies the remote control device about the disconnectable state. Specifically, the control unit 201 notifies the remote controller 100 of data representing the disconnectable state. Hereinafter, "to transmit the data representing the disconnectable state" is expressed as "to notify of the disconnectable state." The remote controller 100 which has accepted this notification determines whether a disconnection request is to be transmitted to the digital camera 200 in accordance with not a situation that the user presses down a button but a notification content.

If the AF setting is continuous AF (CONTINUOUS AF in step S802) as a result of the determination in step S802, in step S804 the control unit 201 makes control so that the remote controller 100 is not notified of the disconnectable state. In this state, the remote controller 100 determines whether the Bluetooth® Low Energy communication is to be disconnected in accordance with the user pressing down the button.

A case where the determination is made in step S801 that the operated button is the release button 111 (RELEASE BUTTON in step S801) will be described below. In this case, in step S805 the control unit 201 verifies the setting of the release operation selector switch 115.

If the setting of the release operation selector switch 115 is determined to be the immediate release (IMMEDIATE RELEASE in step S805) as a result of the determination in step S805, in step S806 the control unit 201 checks the imaging mode.

If the imaging mode is determined to be other than the bulb imaging (OTHER THAN BULB in step S806) as a result of the determination in step S806, in step S807 the control unit 201 checks a drive mode.

If the drive mode is determined to be single imaging (SINGLE IMAGING in step S807) as a result of the determination in step S807, in step S808 the control unit 201 notifies the remote controller 100 of the disconnectable state.

If the drive mode is determined to be continuous imaging (CONTINUOUS IMAGING in step S807) as a result of the determination in step S807, in step S809 the control unit 201 makes control so that the remote controller 100 is not notified of the disconnectable state.

If the imaging mode is determined to be the bulb imaging (BULB in step S806) as a result of the determination in step S806, in step S810 the control unit 201 notifies the remote controller 100 of the disconnectable state.

If the setting of the release operation selector switch 115 is determined to be the 2-second delay release (2-SECOND DELAY RELEASE in step S805) as a result of the determination in step S805, in step S811 the control unit 201 checks the imaging mode.

If the imaging mode is determined to be other than the bulb imaging (OTHER THAN BULB in step S811) as a result of the determination in step S811, in step S812 the control unit 201 checks the drive mode.

If the drive mode is determined to be the single imaging (SINGLE IMAGING in step S812) as a result of the determination in step S812, in step S813 the control unit 201 notifies the remote controller 100 of the disconnectable state.

If the drive mode is determined to be the continuous imaging (CONTINUOUS IMAGING in step S812) as a result of the determination in step S812, in step S814 the control unit 201 does not notify the remote controller 100 of the disconnectable state.

If the imaging mode is determined to be the bulb imaging mode (BULB in step S811) as a result of the determination in step S811, in step S815 the control unit 201 notifies the remote controller 100 of the disconnectable state.

If the setting of the release operation selector switch 115 is determined to be the moving image (MOVING IMAGE in step S805) as a result of the determination in step S805, in step S816 the control unit 201 notifies the remote controller 100 of the disconnectable state.

A case where in step S801 the operated button is determined to be the Wide button 113 or the Tele button 114 (Wide or Tele in step S801) will be described below. In this case, in step S817 the control unit 201 verifies whether the lens has been driven to the end.

If the lens is determined to be driven to the end (ALREADY DRIVEN TO END in step S817) as a result of the determination in step S817, in step S818 the control unit 201 notifies the remote controller 100 of the disconnectable state.

If the lens is determined not to be driven to the end (NOT DRIVEN TO END in step S817) as a result of the determination in step S817, in step S819 the control unit 201 does not notify the remote controller 100 of the disconnectable state.

The above has been described the operation of the digital camera 200.

As described above, the digital camera 200 according to the present exemplary embodiment transmits information for selecting whether the determination on the disconnectable state is made based on to an operation on the remote controller 100 or regardless of an operation on the remote controller 100 in accordance with an imaging function remotely instructed to be executed. Therefore, the remote controller 100 can disconnect the communication as soon as possible to improve power saving, and can also disconnect the communication in accordance with a user's operation to realize disconnection timing according to a user's intention.

Other Embodiments

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-069216, filed Mar. 30, 2017, which is hereby incorporated by reference herein in its entirety.

What is claimed is:

1. An imaging apparatus comprising:
an imaging device;
one or more processors configured to perform the following operations:
communicating, via a communication interface, with an external apparatus; and
controlling the imaging apparatus to perform any one of a plurality of imaging modes using the imaging device, wherein the controlling controls the imaging device based on a signal received from the external apparatus,
wherein, in a case where the received signal is a signal for causing the imaging apparatus to perform a first imaging operation, the controlling causes the imaging apparatus to perform the first imaging operation and enables transmission of information indicating that communication, via the communication interface, between the external apparatus and the imaging apparatus is disconnectable by the external apparatus, and
wherein, in a case where the received signal is a signal for causing the imaging apparatus to perform a second imaging operation, the controlling causes the imaging apparatus to perform the second imaging operation and does not enable transmission of information indicating that communication, via the communication interface, between the external apparatus and the imaging apparatus is disconnectable by the external apparatus.

2. The imaging apparatus according to claim 1,
wherein, in performing the first imaging operation, the imaging apparatus executes the first imaging operation once for each received signal regarding the first imaging operation, and
wherein, in performing the second imaging operation, the imaging apparatus executes the second imaging operation more than once, by continuously repeating the second imaging operation, for each received signal regarding the second imaging operation.

3. The imaging apparatus according to claim 1, wherein the second imaging operation comprises at least one or more of the following: execution of one-shot autofocus (AF), execution of single imaging, start of bulb imaging, end of the bulb imaging, start of moving image capture, and end of the moving image capture.

4. The imaging apparatus according to claim 1, wherein the first imaging operation comprises at least one or more of the following: execution of continuous AF and execution of continuous imaging.

5. The imaging apparatus according to claim 1,
wherein, in a case where the first imaging operation is a zoom operation and a lens unit to be driven by the imaging device is not yet driven to an end, the controlling prevents transmitting the information indicating the disconnectable state to the external apparatus, and
wherein, in a case where the first imaging operation is the zoom operation and the lens unit is already driven to the end, the controlling enables transmitting the information indicating the disconnectable state to the external apparatus.

6. The imaging apparatus according to claim 1, wherein, in a case where the controlling enables transmitting the information indicating that the communication, via the communication interface, is disconnectable by the external apparatus, the controlling enables transmitting the information without waiting for completion of the operation instructed by the received signal.

7. The imaging apparatus according to claim 1, wherein in a case where a disconnection request is transmitted from the external apparatus, the controlling disconnects the communication between the image apparatus and the external apparatus regardless of whether the information indicating the disconnectable state is transmitted.

8. The imaging apparatus according to claim 1, wherein the communication interface establishes wireless communication with the external apparatus via an advertisement signal of Bluetooth® Low Energy communication.

9. A control method for an imaging apparatus, the imaging apparatus including an imaging device and a communication interface configured to communicate with an external apparatus, the control method comprising:
controlling the imaging apparatus to perform any one of a plurality of imaging modes using the imaging device;
controlling the imaging device based on a signal received from the external apparatus;
in a case where the received signal is a signal for causing the imaging apparatus to perform a first imaging operation, causing the imaging apparatus to perform the first imaging operation and enabling transmission of information indicating that the communication, via the communication interface, between the external apparatus and the imaging apparatus is disconnectable by the external apparatus; and
in a case where the received signal is a signal for causing the imaging apparatus to perform a second imaging operation, causing the imaging apparatus to perform the second imaging operation and not enabling transmission of information indicating that communication, via the communication interface, is disconnectable by the external apparatus.

10. A non-transitory computer-readable storage medium storing a program for causing an imaging apparatus to execute a method, the imaging apparatus including an imaging device and a communication interface configured to communicate with an external apparatus, the method comprising:
controlling the imaging apparatus to perform any one of a plurality of imaging modes using the imaging device;
controlling the imaging device based on a signal received from the external apparatus; and
in a case where the received signal is a signal for causing the imaging apparatus to perform a first imaging operation, causing the imaging apparatus to perform the first imaging operation and enabling transmission of information indicating that the communication, via the communication interface, between the external apparatus and the imaging apparatus is disconnectable by the external apparatus; and
in a case where the received signal is a signal for causing the imaging apparatus to perform a second imaging operation, causing the imaging apparatus to perform the second imaging operation and not enabling transmission of information indicating that communication, via the communication interface, is disconnectable by the external apparatus.

* * * * *